(12) United States Patent
Yamane

(10) Patent No.: US 8,835,793 B2
(45) Date of Patent: Sep. 16, 2014

(54) FIXING MECHANISM OF WIRE GUIDE OF WIRE ELECTRIC DISCHARGE MACHINE

(71) Applicant: Fanuc Corporation, Yamanashi (JP)

(72) Inventor: Hikaru Yamane, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/684,885

(22) Filed: Nov. 26, 2012

(65) Prior Publication Data

US 2013/0180958 A1   Jul. 18, 2013

(30) Foreign Application Priority Data

Jan. 17, 2012   (JP) ................................ 2012-007448

(51) Int. Cl.
*B23H 7/00* (2006.01)
*B23H 7/14* (2006.01)
*G06F 19/00* (2011.01)
*B23H 1/00* (2006.01)
*B23H 7/10* (2006.01)

(52) U.S. Cl.
CPC . *B23H 1/00* (2013.01); *B23H 7/105* (2013.01)
USPC ...................... 219/69.12; 219/69.13; 700/162

(58) Field of Classification Search
USPC .............................. 219/69.12, 69.13; 700/162
See application file for complete search history.

(56) References Cited

U.S. PATENT DOCUMENTS

| | | | | |
|---|---|---|---|---|
| 2,677,746 A | * | 5/1954 | Duch et al. ..................... | 219/104 |
| 4,778,973 A | | 10/1988 | Derighetti et al. | |
| 4,818,848 A | * | 4/1989 | Obara et al. ................ | 219/69.12 |
| 5,045,661 A | * | 9/1991 | Gamo et al. ................ | 219/69.12 |
| 5,089,680 A | | 2/1992 | Truty | |
| 5,128,505 A | * | 7/1992 | Matter ........................ | 219/69.12 |
| 5,199,516 A | * | 4/1993 | Fernandez ..................... | 175/366 |
| 5,237,145 A | * | 8/1993 | Magara et al. ............. | 219/69.12 |
| 5,357,072 A | * | 10/1994 | Garwick .................... | 219/69.12 |

(Continued)

FOREIGN PATENT DOCUMENTS

| | | |
|---|---|---|
| CH | 683328 A5 | 2/1994 |
| CN | 1133952 A | 10/1996 |

(Continued)

OTHER PUBLICATIONS

Office Action iissued in Japanese Patent Application No. 2012-007448 mailed on Feb. 26, 2013 and English translation.

(Continued)

*Primary Examiner* — Dana Ross
*Assistant Examiner* — Gyounghyun Bae
(74) *Attorney, Agent, or Firm* — Lowe Hauptman & Ham, LLP

(57) ABSTRACT

On a wire guide supporting face of a wire guide supporting part which supports a wire guide of a wire electric discharge machine, two wall faces which are orthogonal to the wire guide supporting face are formed to be arranged in a V shape. On the other hand, two planar parts which are abutted on the two orthogonal wall faces, which are arranged in the V shape, of the wire guide supporting part are formed on the wire guide. Then, the wire guide is fixed on the wire guide supporting part with a screw in a state in which the two orthogonal wall faces of the wire guide supporting part and the two planar parts of the wire guide are respectively abutted on each other.

10 Claims, 15 Drawing Sheets

(56) References Cited

U.S. PATENT DOCUMENTS

| | | | |
|---|---|---|---|
| 5,556,551 A * | 9/1996 | Matsushima et al. | 219/69.12 |
| 5,791,803 A | 8/1998 | Nordquist | |
| 6,698,639 B1 * | 3/2004 | Otomo et al. | 226/97.4 |
| 6,747,236 B1 | 6/2004 | Magara et al. | |
| 6,787,727 B2 * | 9/2004 | Yamada et al. | 219/69.12 |
| 2002/0002417 A1 * | 1/2002 | Irie | 700/162 |
| 2004/0101373 A1 | 5/2004 | Isaksson et al. | |
| 2005/0224488 A1 * | 10/2005 | Matiash | 219/137.63 |
| 2007/0228015 A1 * | 10/2007 | Kita et al. | 219/69.12 |
| 2008/0290071 A1 * | 11/2008 | Arakawa et al. | 219/69.12 |
| 2009/0236318 A1 * | 9/2009 | Sakaguchi | 219/69.12 |
| 2010/0199909 A1 * | 8/2010 | Bamberg et al. | 117/13 |
| 2011/0233172 A1 | 9/2011 | Sato et al. | |
| 2013/0037522 A1 | 2/2013 | Hosaka | |

FOREIGN PATENT DOCUMENTS

| | | | |
|---|---|---|---|
| CN | 1146738 A | | 4/1997 |
| CN | 1423587 A | | 6/2003 |
| CN | 1450944 A | | 10/2003 |
| CN | 201493575 U | | 6/2010 |
| JP | 56-146629 A | | 11/1981 |
| JP | 58-196926 A | | 11/1983 |
| JP | 61-173818 A | | 8/1986 |
| JP | 3-103117 U | | 10/1991 |
| JP | 4-269121 A | | 9/1992 |
| JP | 2010-5719 A | | 1/2010 |
| JP | 2011-230216 A | | 11/2011 |
| WO | 9529026 A1 | | 11/1995 |

OTHER PUBLICATIONS

Office Action mailed Dec. 23, 2013, corresponds to Chinese patent application No. 201310015525.8.

Extended European Search Report issued Jun. 16, 2014, corresponds to European patent application No. 12193754.4.

\* cited by examiner

FIXING MECHANISM OF WIRE GUIDE OF WIRE ELECTRIC DISCHARGE MACHINE

RELATED APPLICATIONS

The present application claims priority from, Japanese Application No. 2012-007448 filed Jan. 17, 2012, the disclosure of which is hereby incorporated by reference herein in its entirety.

BACKGROUND OF THE INVENTION

1. Field of the Invention

The present invention relates to a fixing mechanism, which fixes a wire guide on a wire guide supporting face of a wire guide supporting part, of a wire guide of a wire electric discharge machine.

2. Description of the Related Art

In a wire electric discharge machine which stretches a wire electrode in the Z direction and relatively moves the wire electrode and a workpiece so as to machine the workpiece, the wire electrode is restrained by a part which is called a wire guide so as not to move in the XY direction. The wire guide is detachably fixed on a wire guide supporting part by a fixing means such as a screw. The wire guide is commonly formed such that a circular hole which is larger than a diameter of a wire electrode line by approximately several μm to 10 μm is formed in a high hardness material such as ruby. When the wire electrode is changed to a wire electrode having a different diameter, the wire guide is exchanged into a wire guide adapted to the diameter of the new wire electrode. The diameter of a wire guide is selected and exchanged depending on various conditions such as a plate thickness, a shape, a machining speed, and machining accuracy of a workpiece which is to be machined, and running cost. Further, the wire guide is abraded through a long period of use, so that the wire guide is exchanged for a new wire guide and the old wire guide is discarded.

A position of the wire electrode in the XY direction is determined depending on a position of a wire guide which restrains the wire electrode. Therefore, when a new wire guide is used, it is necessary to measure a vertical position of a wire electrode and a position of a supporting point of taper machining according to the wire guide. In a case where highly-accurate machining is performed, it is necessary to highly accurately measure a vertical position and a supporting point position as well. The measurement takes at least 30 minutes, commonly, one hour. After the measurement of a vertical position and a supporting point position is completed, the measurement values are inputted and stored in a control device of a machine and are used in actual machining of a workpiece. Unless a position of a wire guide is changed, the values of the vertical position and the supporting point position can be continually used as they are even when a workpiece and a machining content are changed.

In order to reduce a trouble of exchanging wire electrodes in machining of a workpiece, Japanese Patent Application Laid-Open No. 58-196926 discloses a wire electric discharge machine which is provided with a plurality of pairs of wire guides so as to automatically supply wire electrodes having different wire diameters from each other and thus can change the wire electrode diameter without getting any assistance from someone in the middle of machining.

Here, an example of a wire guide and a wire guide supporting part on a lower side according to the prior art configuration is described with reference to FIGS. 1 to 3.

A wire guide 8 and a wire guide supporting part 6 respectively have abutting faces on the XY plane. The wire guide 8 is provided with a male screw and the wire guide supporting part 6 is provided with a female screw. The wire guide 8 is screwed until the abutting face 8a of the wire guide 8 and the abutting face 6a of the wire guide supporting part 6 abut on each other, so as to be fixed on the wire guide supporting part 6. In a case of this configuration, high restoration accuracy of a position in the Z direction which is orthogonal to the XY plane of the abutting faces can be expected, but an error caused by a gap between the male screw and the female screw is generated in the XY direction. In addition, there is a gap between a center axis of a hole which supports a wire electrode 4 and a center axis of a screw hole. Therefore, a phase on which the wire guide 8 is fixed is shifted due to variation of a fastening torque for fixing the wire guide 8 on the wire guide supporting part 6, generating an error in the XY direction A wire guide and a wire guide supporting part according to prior art commonly have such configuration that a screw part for fixing the wire guide has both of roles of a positioning mechanism for positioning the wire guide in the XY direction and a fixing mechanism for fixing the wire guide. It is difficult to manufacture a part of which fitting accuracy between a male screw and a female screw is enhanced, requiring higher cost. Therefore, a screw part of a wire guide and a screw part of a wire guide supporting part of prior art have a common loose-fitting structure. Consequently, a wire guide is not always restored on the same position when the wire guide is detached and attached again, commonly generating an error of 10 μm or more between before and after detachment of the wire guide from the wire guide supporting part. Therefore, when a wire guide is exchanged for another wire guide, a previous measurement value which is stored in a control device cannot be used as it is and it is necessary to perform measurement requiring long time in every exchange.

Thus, even though wire guides need to be frequently exchanged depending on a machining content, a fixing mechanism of a wire guide according to prior art has the configuration that requires considerable steps in every exchange of wire guides, deteriorating productivity of a wire electric discharge machine.

SUMMARY OF THE INVENTION

Therefore, in the present invention, it is an object to provide a fixing mechanism of a wire guide of a wire electric discharge machine which exhibits enhanced restoration accuracy of a wire guide fixing position after the wire guide is detached from a wire guide supporting part and has high productivity.

The present invention relates to a fixing mechanism of a wire guide of a wire electric discharge machine. The wire electric discharge machine supports a wire electrode by upper and lower wire guides and relatively moves the wire electrode and a workpiece so as to machine the workpiece, while the fixing mechanism of the wire guide fixes the wire guide of the wire electric discharge machine on a wire guide supporting face of a wire guide supporting part.

In the fixing mechanism of a wire guide of a wire electric discharge machine according to a first aspect of the present invention, at least two planar parts, not parallel to each other, having faces different from the wire guide supporting face are provided on the wire guide supporting part; planar parts that are configured to be abutted on the two planar parts of the wire guide supporting part are provided on the wire guide; and the fixing mechanism further comprises a fixing unit configured to fix the wire guide on the wire guide supporting part in a state where the two planar parts of the wire guide supporting part and two of the planar parts of the wire guide are respectively abutted on each other.

In the fixing mechanism of a wire guide of a wire electric discharge machine according to a second aspect of the present invention, at least two planar parts, not parallel to each other, having faces different from the wire guide supporting face are provided on the wire guide supporting part; a planar part configured to be abutted on one of the two planar parts of the wire guide supporting part and a cylindrical face configured to be abutted on the other planar part of the wire guide supporting part are provided on the wire guide; and the fixing mechanism further comprises a fixing unit configured to fix the wire guide on the wire guide supporting part in a state where the planar part and the cylindrical face of the wire guide are respectively abutted on the two planar parts of the wire guide supporting part.

In the fixing mechanism of a wire guide of a wire electric discharge machine according to a third aspect of the present invention, at least two fitting parts having a concave or convex shape are provided on the wire guide supporting face of the wire guide supporting part; at least two fitting parts having a convex or concave shape, configured to be fitted to the concave or convex shape of the wire guide supporting part, are provided on that face of the wire guide which is opposed to the wire guide supporting face; and the fixing mechanism further comprises a fixing unit configured to fix the wire guide on the wire guide supporting part in a state where the fitting parts of the wire guide are respectively fitted to the fitting parts of the wire guide supporting part.

In the fixing mechanism of a wire guide of a wire electric discharge machine according to a fourth aspect of the present invention, a cylindrical part having a concave or convex shape and at least one rotation suppression part having a shape of a planar surface, a cylindrical surface or a spherical surface are provided on the wire guide supporting face of the wire guide supporting part; a cylindrical part having a concave or convex shape and being rotatably fitted to the cylindrical part of the wire guide supporting part and at least one rotation suppression part having a shape of a planar surface, a cylindrical surface or a spherical surface are provided on that face of the wire guide which is opposed to the wire guide supporting face; and the fixing mechanism further comprises a fixing unit configured to fix the wire guide on the wire guide supporting part in a state where the cylindrical part of the wire guide is rotatably fitted to the cylindrical part of the wire guide supporting part and the rotation suppression part of the wire guide supporting part and the rotation suppression part of the wire guide are abutted on each other in a direction in which rotation of the cylindrical part is stopped.

The wire guide may be configured to be able to be separated into a wire guide part that supports the wire electrode and a wire guide fixing part that fixes the wire guide part.

According to the present invention, a fixing mechanism of a wire guide of a wire electric discharge machine which exhibits enhanced restoration accuracy of a wire guide fixing position after the wire guide is detached from a wire guide supporting part and has high productivity can be provided.

BRIEF DESCRIPTION OF THE DRAWINGS

The above-mentioned and other object and features of the present invention will be clear from the following description of embodiments with reference to the accompanying drawings. Among the drawings.

DETAILED DESCRIPTION OF THE PREFERRED EMBODIMENTS

Figure 1:
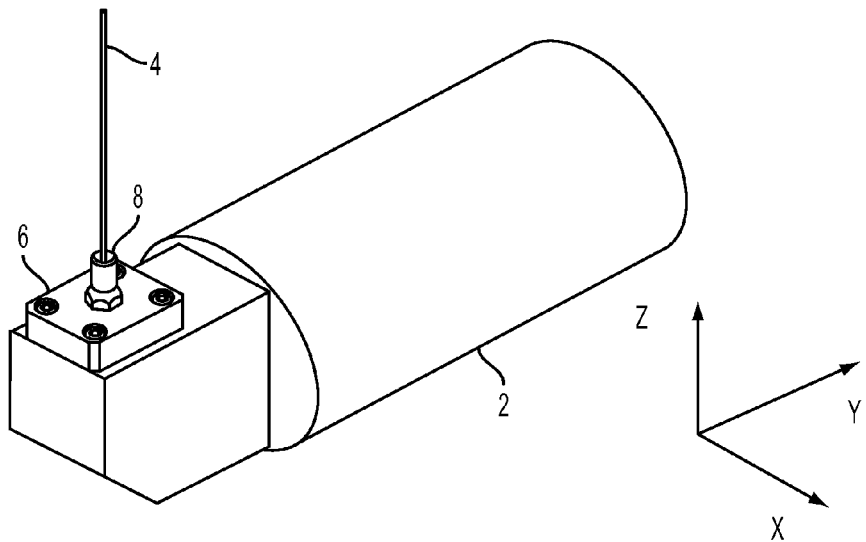
FIG. 1 illustrates a wire guide and a wire guide supporting part on a lower side in the prior art configuration.
Figure 2:
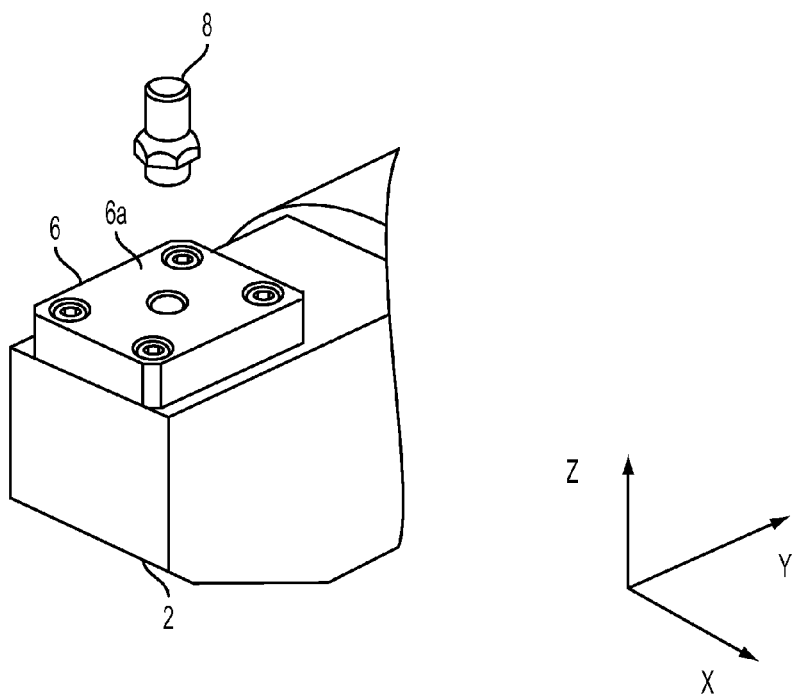
FIG. 2 is an enlarged view of the wire guide supporting part of FIG. 1.
Figure 3:
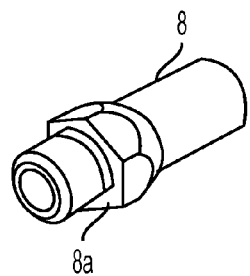
FIG. 3 illustrates the wire guide which is depicted in FIGS. 1 and 2.

Embodiments of a fixing mechanism of a wire guide of a wire electric discharge machine according to the present invention are described below with reference to the accompanying drawings. Here, configurations same as those in the description of the prior art technique are described by using the same reference numerals or characters. For the sake of expediency in description, a wire guide supporting face of a wire guide supporting part is set as an XY plane and a direction orthogonal to the wire guide supporting face (XY plane) is set as a Z direction.

A fixing mechanism of a wire guide according to a first embodiment of the present invention is first described with reference to FIGS. 4 to 6. This embodiment is characterized in that both of a wire guide supporting part and a wire guide have V-shaped planar parts.

Commonly, a wire electric discharge machine supports a wire electrode 4 with an upper wire guide and a lower wire guide and relatively moves the wire electrode 4 and a workpiece (not depicted) so as to machine the workpiece. The upper wire guide and the lower wire guide are respectively supported by an upper wire guide supporting part and a lower wire guide supporting part. The upper wire guide and the lower wire guide have the same configuration with respect to one another and the upper wire guide supporting part and the lower wire guide supporting part have the same configuration with one another so as to be collectively called a wire guide and a wire guide supporting part respectively in the description.

A fixing mechanism for fixing a wire guide 14 on a wire guide supporting face 12c of a wire guide supporting part 12 is first described. As depicted in FIGS. 4 and 5, the wire guide supporting part 12 is fixed on a lower arm 2 and the wire guide 14 is fixed on the wire guide supporting part 12. This wire guide supporting part 12 has two planar parts 12a and 12b which are formed to be arranged in a V shape (that is, the configuration in which two orthogonal walls are joined with each other by a predetermined angle). The planar parts 12a and 12b are faces which are different from the wire guide supporting face 12c (XY plane), being orthogonal walls which are disposed on the wire guide supporting face 12c in a manner to be joined with each other by a predetermined angle. The planar part 12a and the planar part 12b are not parallel to each other. Here, the provision number of the planar parts may be three or more, but positioning of the wire guide 14 in the XY direction is enabled by providing the wire guide supporting part 12 with two planar parts.

Figure 6:
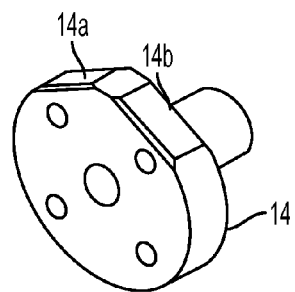
FIG. 6 illustrates the wire guide depicted in FIGS. 4 and 5.

In a similar manner to the wire guide supporting part 12, the wire guide 14 also has two planar parts, namely, a planar part 14a and a planar part 14b which are formed to be arranged in a substantially V shape and are not parallel to each other, as depicted in FIG. 6.

Further, the wire guide supporting part 12 and the wire guide 14 respectively have a plurality of holes for mounting screws 10 on corresponding positions. When the wire guide 14 is fixed on the wire guide supporting part 12, the planar parts 14a and 14b of the wire guide 14 are first abutted on the planar parts 12a and 12b of the wire guide supporting part 12 respectively. Then, the wire guide 14 is fixed on the wire guide supporting part 12 with a fixing means such as the screw 10.

According to the embodiment, movement in the XY direction of the wire guide 14 with respect to the wire guide supporting part 12 is restrained by fitting V-shaped convexity and concavity which are formed on the wire guide 14 and the wire guide supporting part 12, thereby enabling to enhance restoration accuracy of a wire guide fixing position. Here, the fixing means such as the screw 10 for fixing a wire guide on a wire guide supporting part is applied to other embodiments which are described below.

A fixing mechanism of a wire guide according to a second embodiment of the present invention is described with reference to FIGS. 7 to 9. This embodiment is characterized in that a wire guide supporting part has two planar parts which are arranged in a V shape, while a wire guide has a single planar part.

Figure 4:
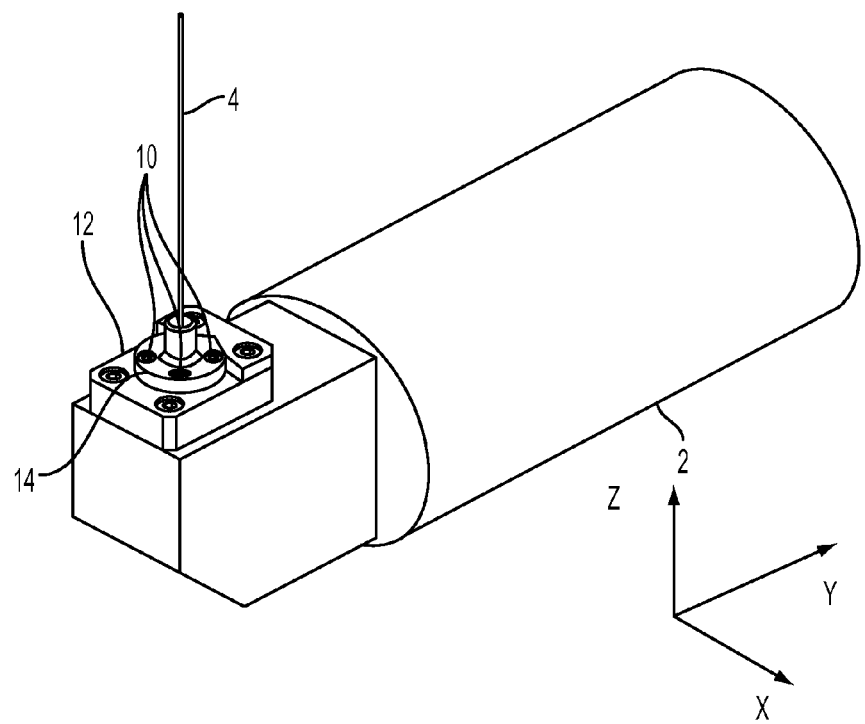
FIG. 4 illustrates a fixing mechanism of a wire guide according to a first embodiment of the present invention.
Figure 5:
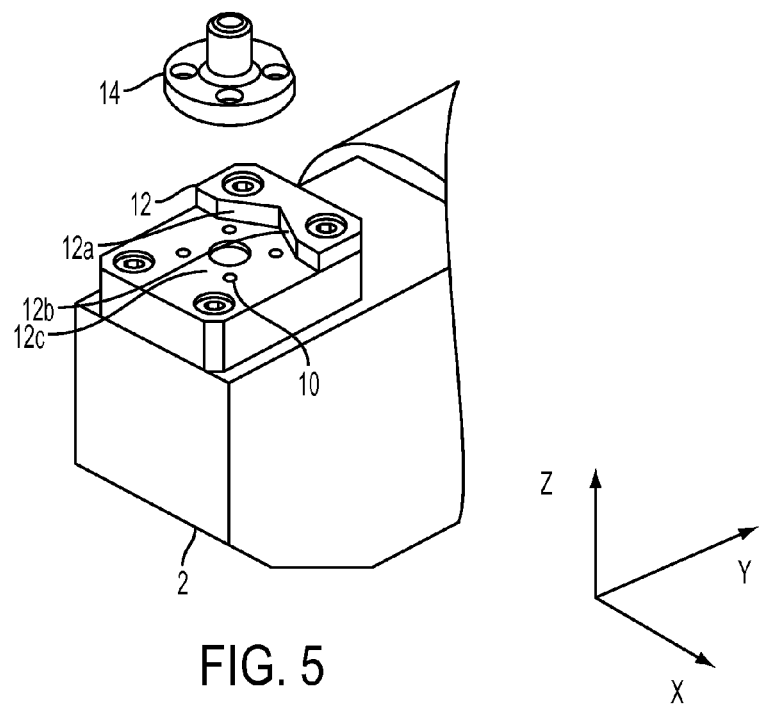
FIG. 5 is an enlarged view of a wire guide supporting part depicted in FIG. 4.
Figure 7:
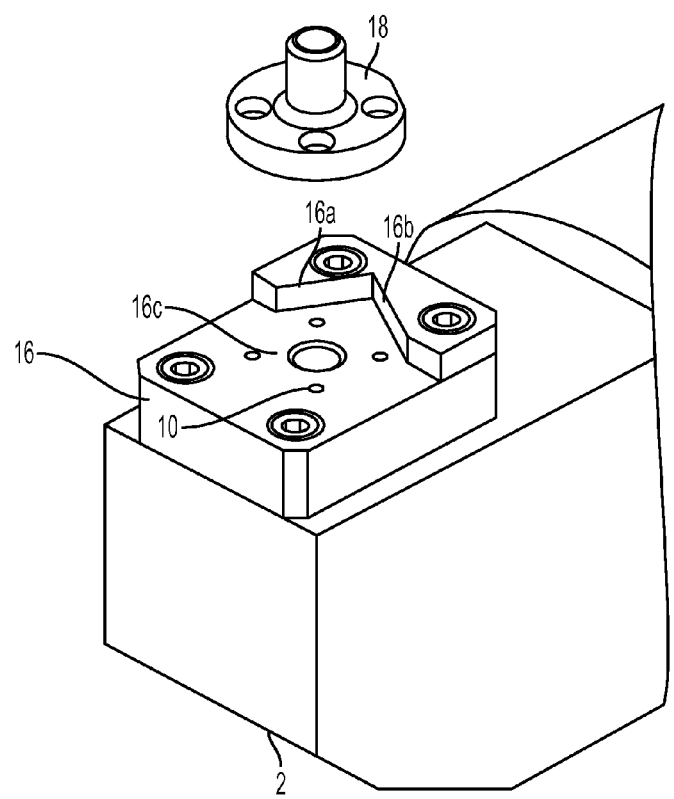
FIG. 7 illustrates a fixing mechanism of a wire guide according to a second embodiment of the present invention.
Figure 7:
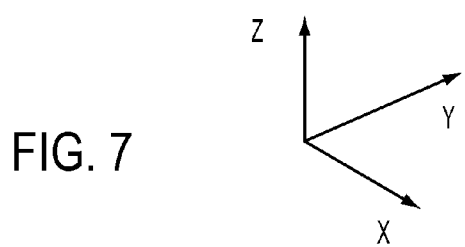
Figure 8:
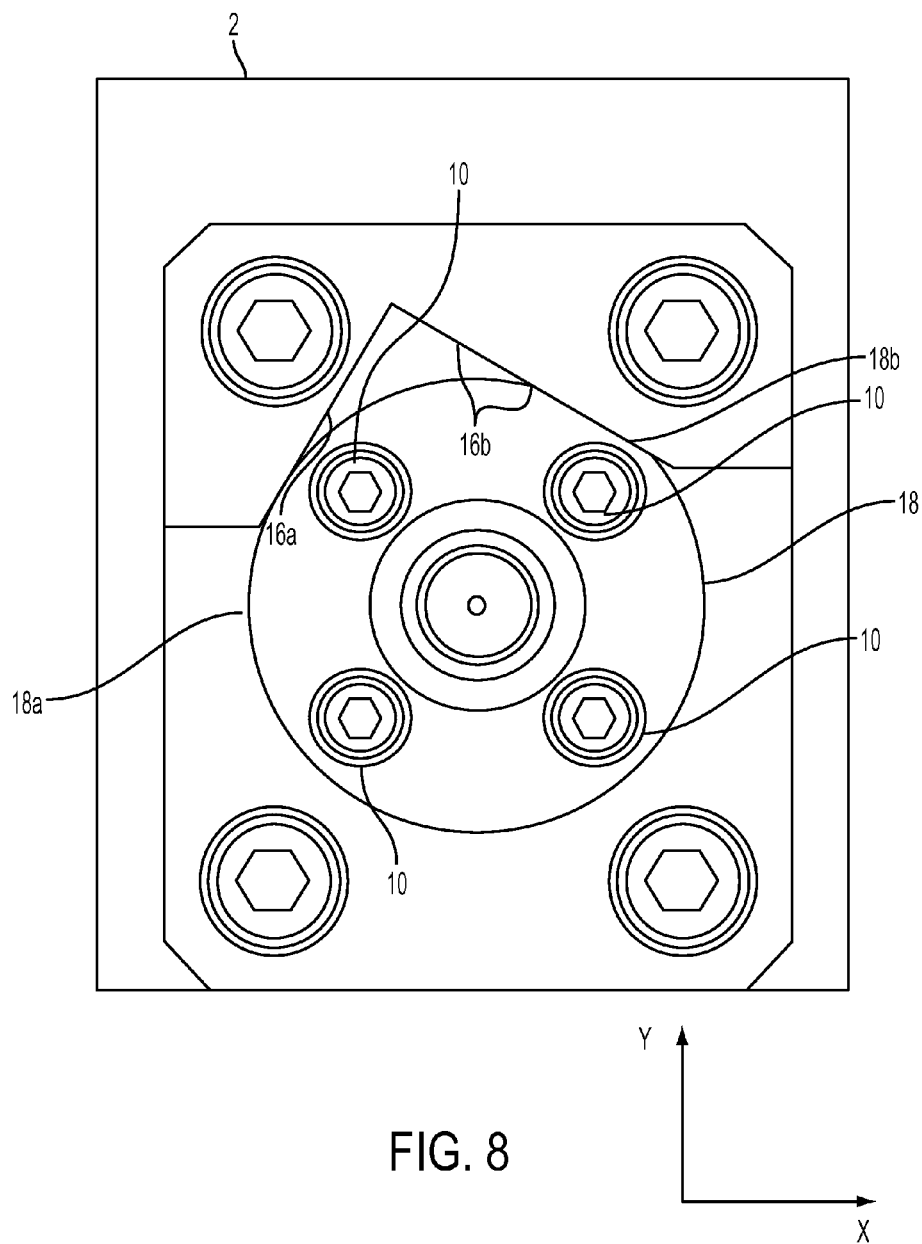
FIG. 8 is an enlarged view of a wire guide supporting part depicted in FIG. 7.

As depicted in FIGS. 7 and 8, a wire guide supporting part 16 has such configuration that two planar parts (orthogonal walls) 16a and 16b are arranged in the V shape on a wire guide supporting face 16c as is the case with the first embodiment (FIGS. 4 and 5). These planar parts 16a and 16b are faces which are different from the wire guide supporting face 16c and are not parallel to each other.

Figure 9:
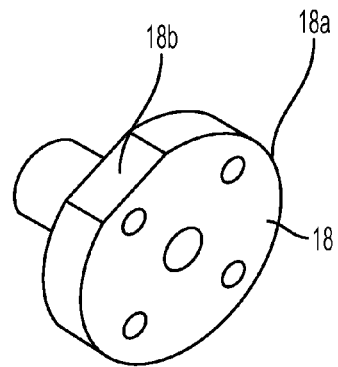
FIG. 9 illustrates the wire guide depicted in FIGS. 7 and 8.

On the other hand, a single planar part 18b is formed on a wire guide 18 by shaving a part of a cylindrical face 18a of the wire guide 18 as depicted in FIG. 9. When the wire guide 18 is fixed on the wire guide supporting part 16, the cylindrical face 18a of the wire guide 18 is first abutted on the planar part 16a of the wire guide supporting part 16 and the planar part 18b of the wire guide 18 is further abutted on the planar part 16b of the wire guide supporting part 16. Then, the wire guide 18 is fixed on the wire guide supporting part 16 with a fixing means such as the screw 10 (refer to FIG. 4).

According to the embodiment, movement in a rotating direction on the XY plane of the wire guide 18 with respect to the wire guide supporting part 16 is restrained by abutting the cylindrical face 18a and the planar part 18b of the wire guide 18 respectively on a pair of planar parts 16a and 16b of the wire guide supporting part 16. Consequently, restoration accuracy of a fixing position of the wire guide 18 can be enhanced by detachably fixing the wire guide 18 on the wire guide supporting part 16 by the fixing means such as the screw 10. In this embodiment, one planarization processing which is performed with respect to the cylindrical face of the wire guide 18 can be omitted and an angle formed by the two planar parts 16a and 16b which are formed on the wire guide supporting part 16 can be arbitrarily determined compared to the above-described first embodiment (FIGS. 4 to 6), so that a shape in the second embodiment can be realized in reduced cost.

Figure 10:
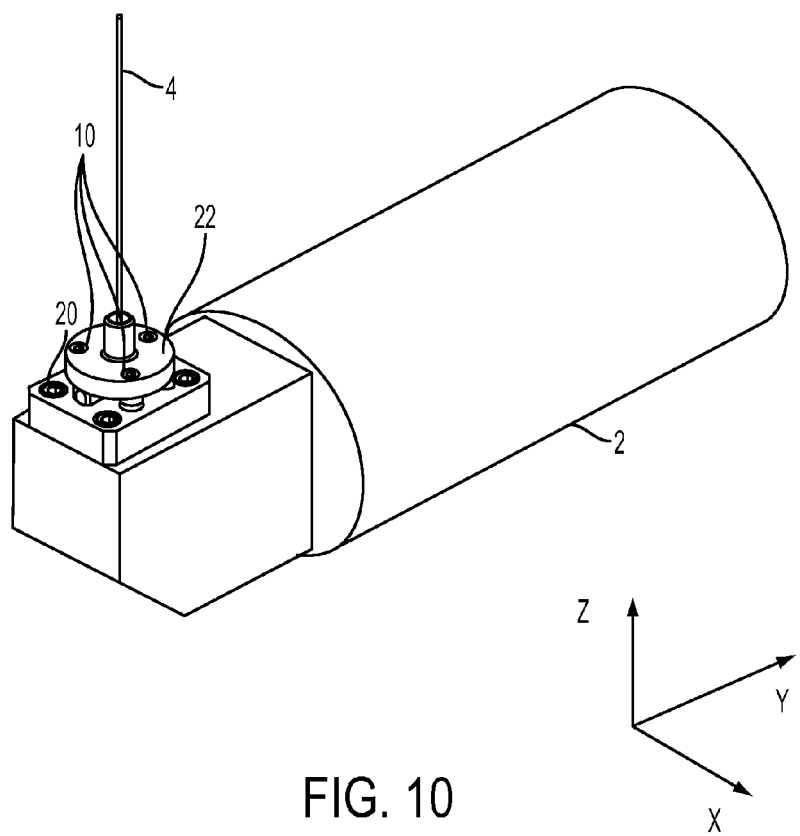
FIG. 10 illustrates a fixing mechanism of a wire guide according to a third embodiment of the present invention.

A fixing mechanism of a wire guide according to a third embodiment of the present invention is now described with reference to FIGS. 10 to 12. This embodiment is characterized in that a wire guide supporting part has a fitting part having a convex shape, while a wire guide has a fitting part having a concave shape.

Figure 11:
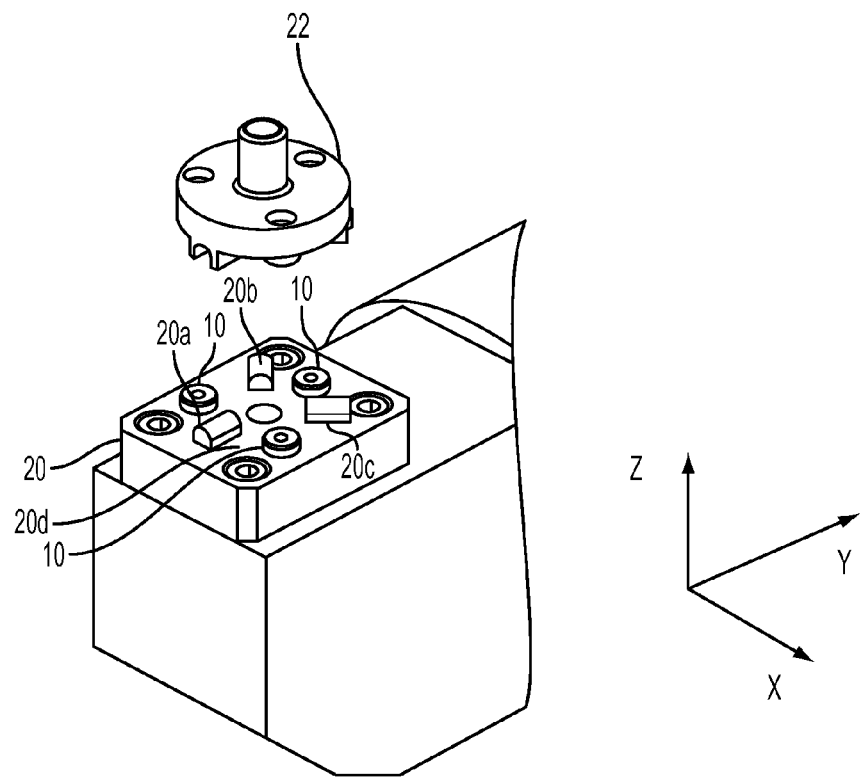
FIG. 11 is an enlarged view of a wire guide supporting part depicted in FIG. 10.
Figure 12:
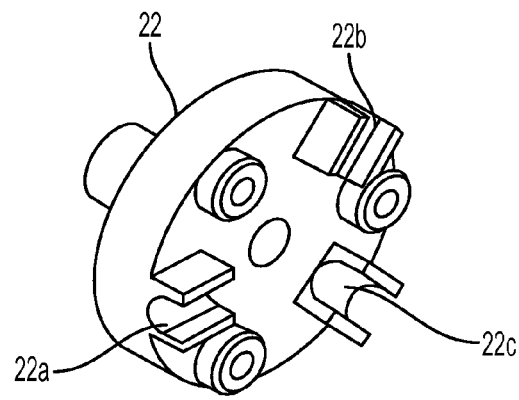
FIG. 12 illustrates the wire guide depicted in FIGS. 10 and 11.

A wire guide supporting part 20 is provided with three convex fitting parts which are fitting convex parts 20a, 20b, and 20c, as depicted in FIG. 11. On the other hand, a wire guide 22 is provided with three concave fitting parts which are fitting concave parts 22a, 22b, and 22c, as depicted in FIG. 12. When the wire guide 22 is fixed on the wire guide supporting part 20 with a fixing means such as the screw 10, the fitting concave parts 22a, 22b, and 22c of the wire guide 22 are first fitted to the fitting convex parts 20a, 20b, and 20c of the wire guide supporting part 20. Then, the wire guide 22 is fixed on the wire guide supporting part 20 with the fixing means such as the screw 10 as depicted in FIG. 10.

According to the embodiment, the fitting convex parts 20a, 20b, and 20c of the wire guide supporting part 20 and the fitting concave parts 22a, 22b, and 22c of the wire guide 22 are fitted to each other respectively (concave-convex engaged), thereby enabling to restrain movement in the XY direction of the wire guide 22 with respect to the wire guide supporting part 20 and enhance restoration accuracy of a wire guide fixing position.

In this embodiment, the fitting part which is provided on a wire guide supporting face 20d of the wire guide supporting part 20 has a convex shape, while the fitting part which is provided on a face, which is opposed to the wire guide supporting face 20d, of the wire guide 22 has a concave shape. In substitution for this configuration, the fitting part which is provided on the wire guide supporting face 20d of the wire guide supporting part 20 may have a concave shape, while the fitting part which is provided on the face, which is opposed to the wire guide supporting face 20d, of the wire guide 22 may have a convex shape.

Figure 13:
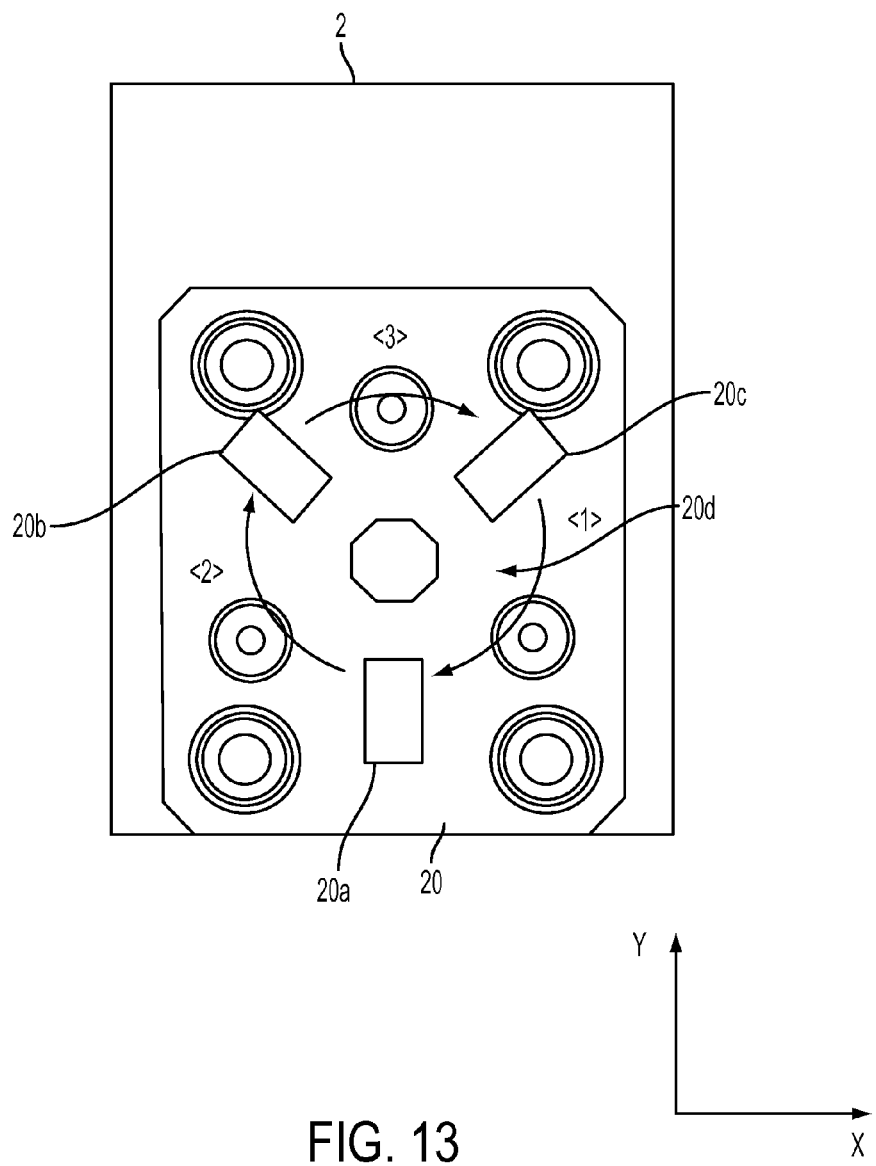
FIG. 13 illustrates a modification of the wire guide supporting part of FIG. 11 (the third embodiment)
Figure 14:
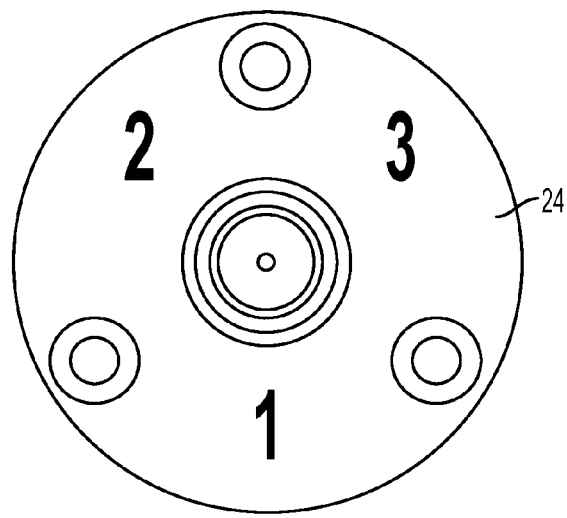
FIG. 14 illustrates a first modification of the wire guide of FIG. 11 (the third embodiment)
Figure 15:
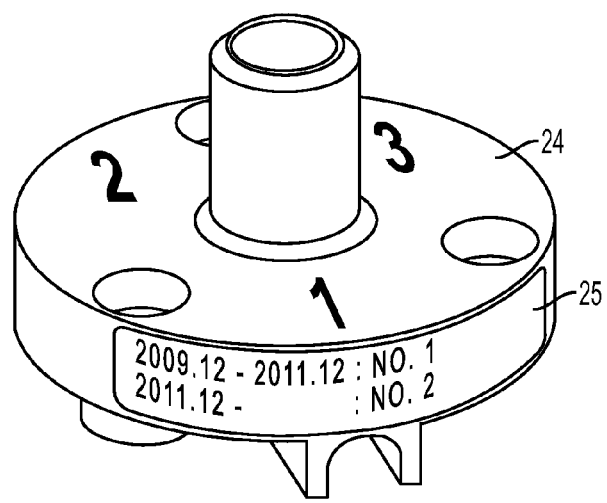
FIG. 15 illustrates a second modification of the wire guide of FIG. 11 (the third embodiment)

Further, as depicted in FIG. 13, a phase in attaching the wire guide 22 to the wire guide supporting part 20 can be limited to one way by carving symbols such as <1>, <2>, and <3> on the wire guide supporting face 20d of the wire guide supporting part 20 and changing a phase of the wire guide 22 with respect to the wire guide supporting part 20 (a phase of an abutting part) when the wire guide 22 is abutted on the wire guide supporting part 20. Accordingly, an error in attachment of the wire guide 22 can be prevented. Alternatively, as depicted in FIG. 14, such use is also applicable that numerical numbers which are '1', '2', and '3' are printed on the wire guide 24 and a phase of the wire guide 24 with respect to the wire guide supporting part 20 is changed regularly so as to prevent eccentric abrasion of the wire guide 24. Further, as depicted by a reference numeral 25 of FIG. 15, an error in attachment of the wire guide 24 can be prevented by marking a phase of attachment of the wire guide 24 with respect to the wire guide supporting part 20.

Figure 16:
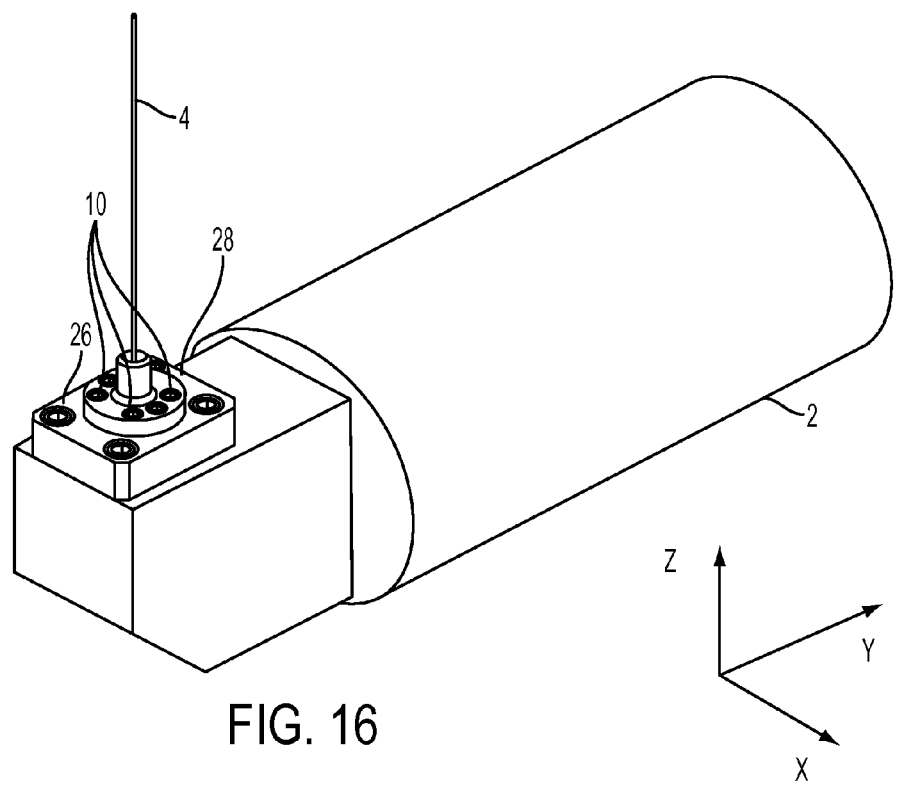
FIG. 16 illustrates a fixing mechanism of a wire guide according to a fourth embodiment of the present invention.

A fixing mechanism of a wire guide according to a fourth embodiment of the present invention is now described with reference to FIGS. 16 to 18. This embodiment is characterized in that a wire guide supporting part has two cylindrical pins and a wire guide has a circular hole and a long circular hole.

Figure 17:
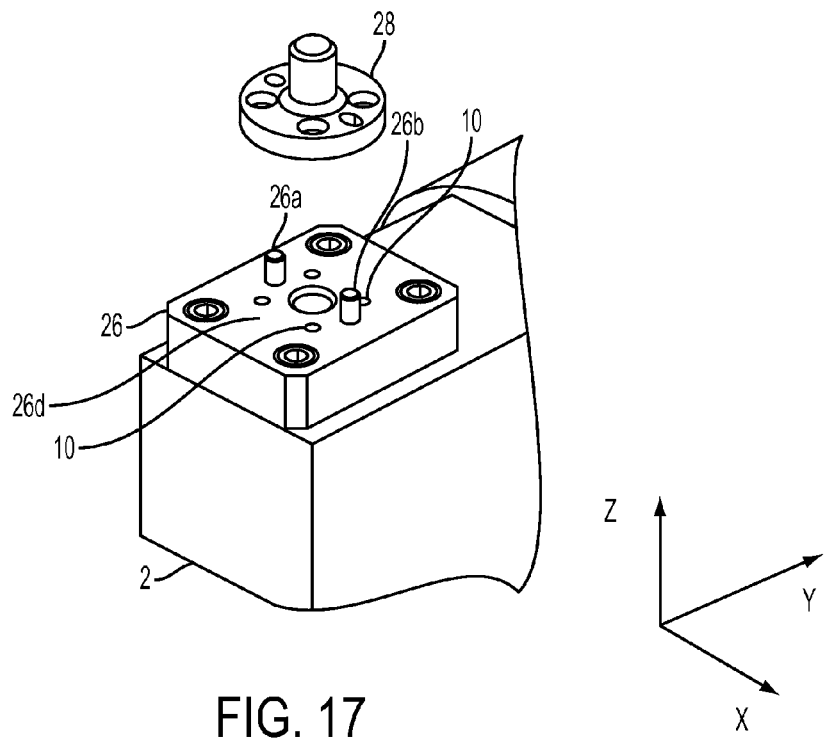
FIG. 17 is an enlarged view of a wire guide supporting part depicted in FIG. 16.
Figure 18:
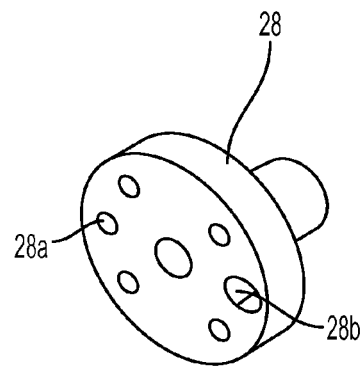
FIG. 18 illustrates the wire guide depicted in FIGS. 16 and 17.
Figure 19:
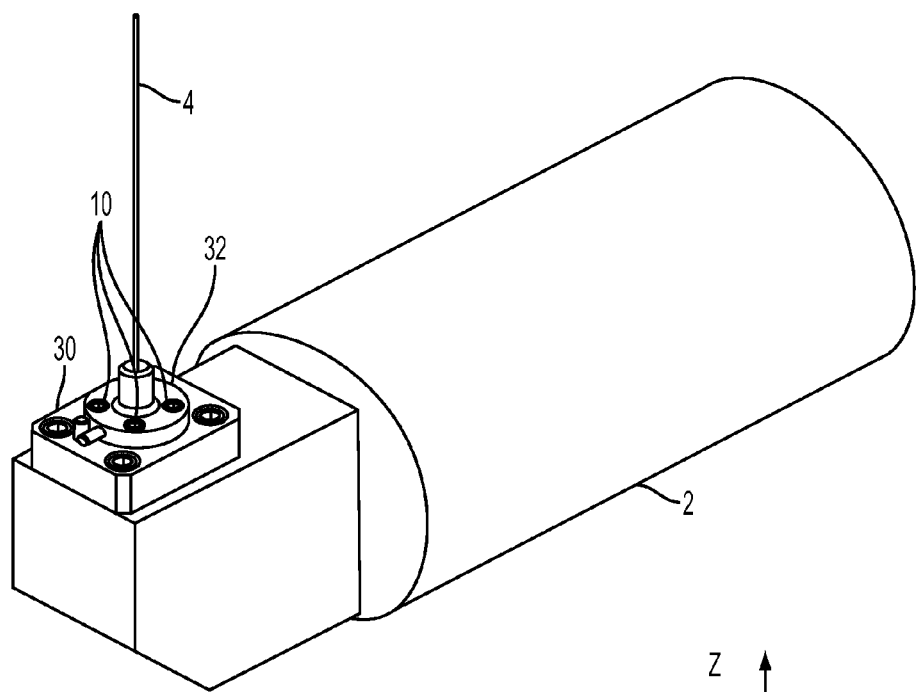
FIG. 19 illustrates a fixing mechanism of a wire guide according to a fifth embodiment of the present invention.

A pair of pins which serve as fitting convex parts 26a and 26b is provided on a wire guide supporting part 26 as depicted in FIG. 17, while a circular hole and a long circular hole which respectively serve as fitting concave parts 28a and 28b are formed on a wire guide 28 as depicted in FIG. 18. The pin and the circular hole are machined to have highly-accurate dimensions so that one pin of the wire guide supporting part 26 highly accurately fits to the circular hole of the wire guide 28. Further, the long circular hole is machined to have the highly-accurate width so that the other pin of the wire guide supporting part 26 highly accurately fits to the long circular hole of the wire guide 28.

According to the embodiment, the pair of pins (fitting convex parts) of the wire guide supporting part 26 fits to the circular hole and the long circular hole (fitting concave parts) of the wire guide 28, restraining movement on the XY plane of the wire guide 28 with respect to the wire guide supporting part 26. Consequently, as depicted in FIG. 16, restoration accuracy of a fixing position of the wire guide 28 can be enhanced by detachably fixing the wire guide 28 on the wire guide supporting part 26 by a fixing means such as the screw 10. Further, an attaching position can be fixed to any one position, or attachment of the wire guide 28 with the phase changed with respect to the wire guide supporting part 26 is enabled, by making diameters of the pair of pins, which serve as the fitting convex parts 26a and 26b, of the wire guide supporting part 26 different from one another or the same with respect to one another.

A fixing mechanism of a wire guide according to a fifth embodiment of the present invention is now described with reference to FIGS. 19 to 22. This embodiment is characterized in that each of a wire guide supporting part and a wire guide has a cylindrical rotation suppression part.

Figure 20:
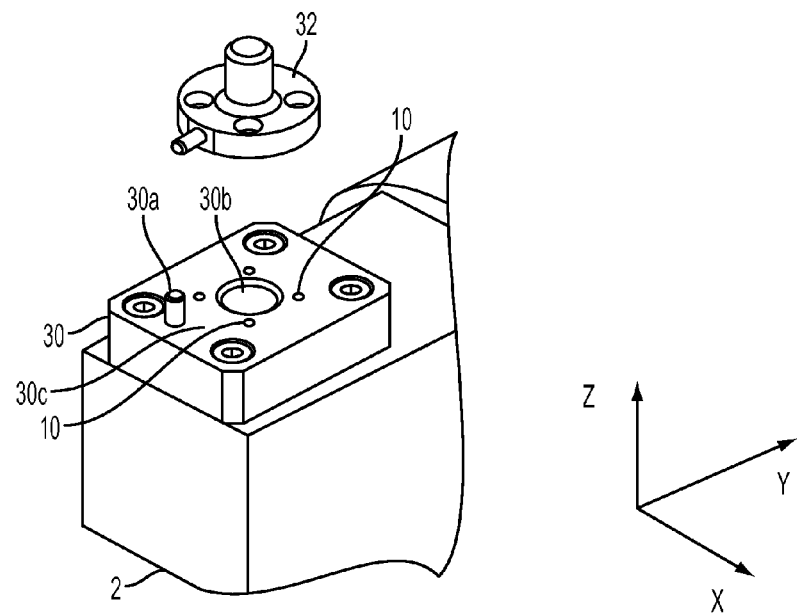
FIG. 20 is an enlarged view of a wire guide supporting part depicted in FIG. 19.
Figure 21:
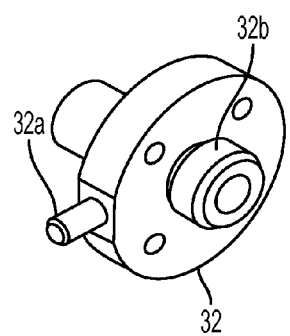
FIG. 21 illustrates the wire guide depicted in FIGS. 19 and 20.
Figure 22:
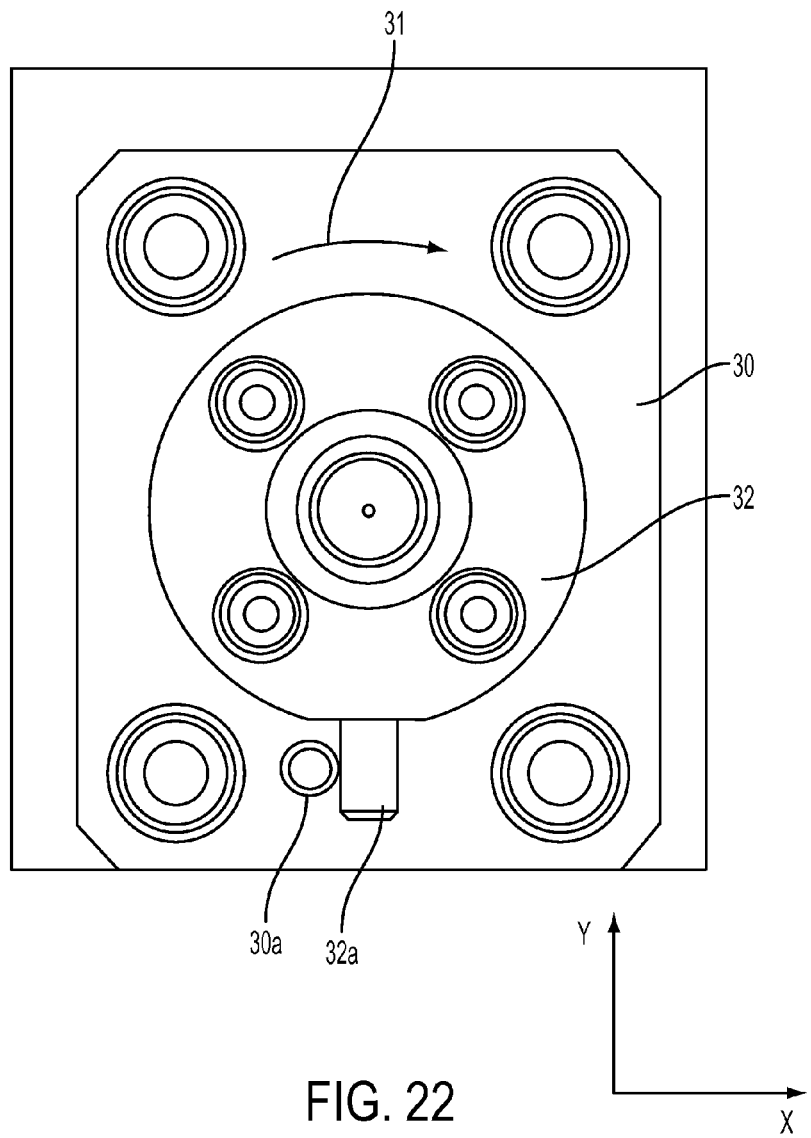
FIG. 22 illustrates that, in the fixing mechanism of the wire guide depicted in FIG. 19, the wire guide is rotated about a cylindrical part thereof with respect to a wire guide supporting part and a rotation suppression part of the wire guide is abutted on a rotation suppression part of the wire guide supporting part so as to suppress movement in a rotating direction of the wire guide.

A wire guide supporting part 30 has a rotation suppression part 30a and a cylindrical part (cylindrical concave part) 30b having a concave shape, on a wire guide supporting face 30c of the wire guide supporting part 30, as depicted in FIG. 20. On the other hand, a rotation suppression part 32a having a cylindrical shape is formed on the side of the wire guide 32 and a cylindrical part (cylindrical convex part) 32b having a convex shape are formed on a face, which is opposed to the wire guide supporting face 30c, of the wire guide 32, as depicted in FIG. 21.

When the wire guide 32 is fixed on the wire guide supporting part 30, the cylindrical convex part 32b of the wire guide 32 is fitted to the cylindrical concave part 30b of the wire guide supporting part 30. Here, the cylindrical concave part 30b and the cylindrical convex part 32b are machined to respectively have highly-accurate inner diameter and outer diameter so that the cylindrical convex part 32b is highly accurately fitted to the cylindrical concave part 30b. Further, in order to suppress movement, in a rotating direction about the cylindrical concave part 30b and the cylindrical convex part 32b, of the wire guide 32 with respect to the wire guide supporting part 30, the wire guide 32 is rotated with respect to the wire guide supporting part 30 about the cylindrical part 32b of the wire guide 32 as depicted by a reference numeral 31 of FIG. 22 and thus the rotation suppression part 32a of the wire guide 32 is abutted on the rotation suppression part 30a of the wire guide supporting part 30.

According to the embodiment, the cylindrical convex part 32b of the wire guide 32 is fitted to the cylindrical concave part 30b of the wire guide supporting part 30, restraining movement in the XY direction of the wire guide 32 with respect to the wire guide supporting part 30. Further, movement in the rotating direction of the wire guide 32 with respect to the wire guide supporting part 30 is suppressed by the rotation suppression part 30a, thereby enabling to enhance restoration accuracy of a fixing position of the wire guide 32. Further, an error in attachment of the wire guide 32 can be prevented by preliminarily marking a rotating direction of the wire guide 32 by a method such as printing as depicted by the reference numeral 31 of FIG. 22.

Here, at least one rotation suppression part 30a having any of shapes of a planar surface, a cylindrical surface, and a spherical surface and a convex cylindrical part, instead of a concave cylindrical part (cylindrical concave part 30b) depicted in FIG. 20, may be formed on the wire guide supporting face 30c of the wire guide supporting part 30. On the other hand, at least one rotation suppression part 32a having any of shapes of a planar surface, a cylindrical surface, and a spherical surface and a concave cylindrical part, instead of a convex cylindrical part (cylindrical convex part 32b) depicted in FIG. 21, may be formed on a face, which is opposed to the wire guide supporting face 30c, of the wire guide 32.

Figure 23:
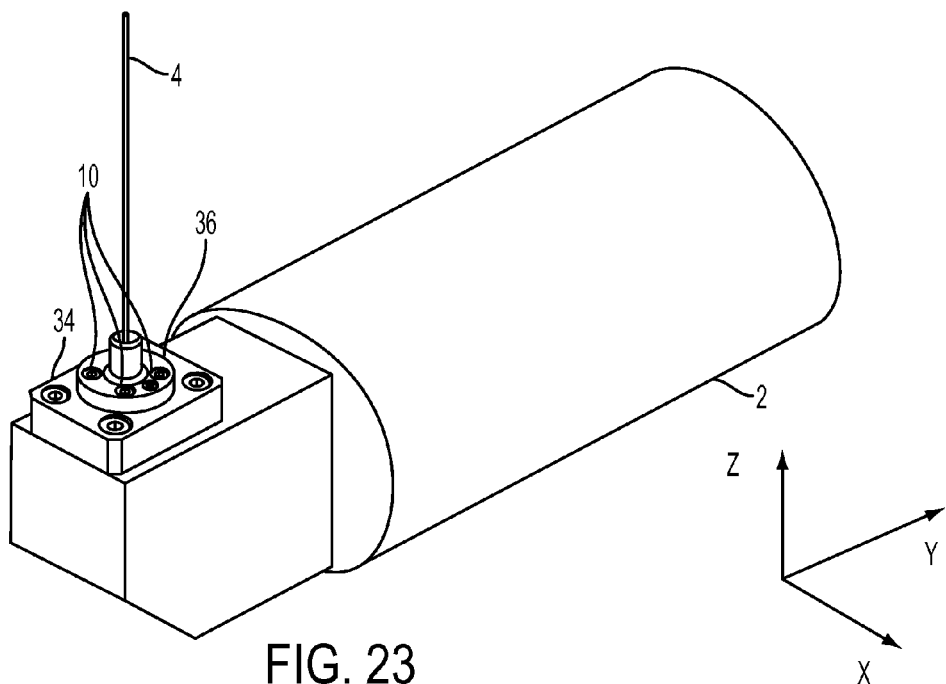
FIG. 23 illustrates a fixing mechanism of a wire guide according to a sixth embodiment of the present invention.

A fixing mechanism of a wire guide according to a sixth embodiment of the present invention is now described with reference to FIGS. 23 to 25. This embodiment is characterized in that a wire guide supporting part has a cylindrical pin and a wire guide has a circular hole and a long circular hole as is the case with the fourth embodiment described above.

In the above description of the fourth embodiment (FIGS. 16 to 18), a pair of pins (fitting convex parts 26a and 26b) is provided on the wire guide supporting part 26, while a circular hole and a long circular hole (fitting concave parts 28a and 28b) are formed on the wire guide 28. Further, the pins, the circular hole, and the long circular hole are machined to have dimensions with high accuracy so that the pin and the circular hole, and the pin and the long circular hole are highly accurately fitted to each other respectively. On the other hand, in the sixth embodiment, a long circular hole and a pin do not always have to be highly accurately fitted to each other unlike the case of the fourth embodiment. In the sixth embodiment, a pin is fitted to a long circular hole with play, and then a wire guide is rotated with respect to a wire guide supporting part so as to be abutted and fixed on the wire guide supporting part.

Figure 24:
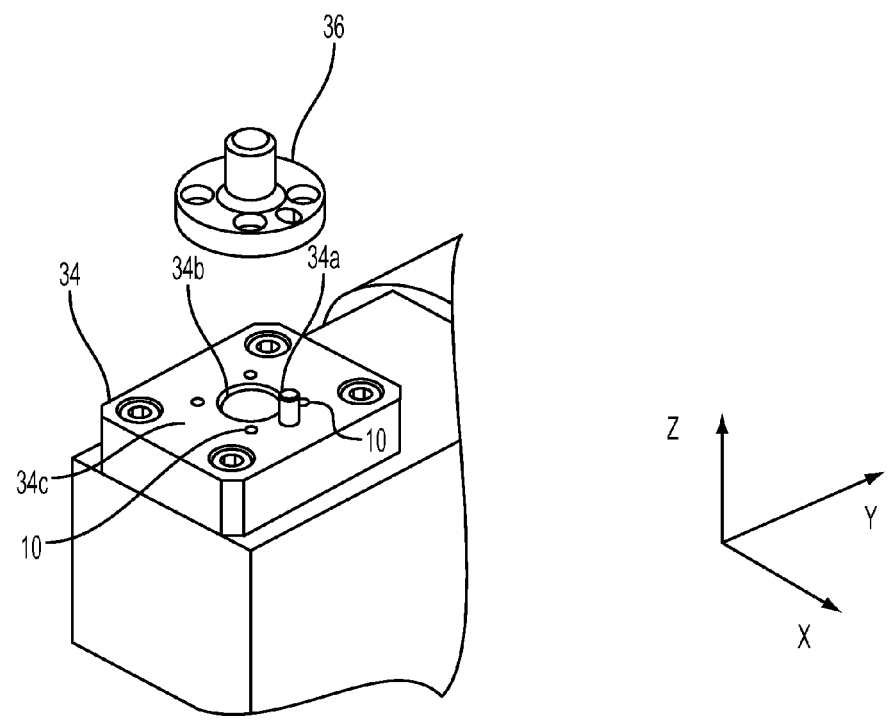
FIG. 24 is an enlarged view of a wire guide supporting part depicted in FIG. 23.
Figure 25:
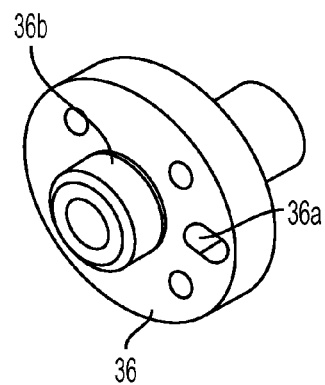
FIG. 25 illustrates the wire guide depicted in FIGS. 23 and 24.

In a wire guide supporting part 34, a cylindrical part 34b having a concave shape (concave cylindrical part) is provided, and a protruded rotation suppression part 34a which extends orthogonally to a wire guide supporting face 34c is provided on the wire guide supporting face 34c of the wire guide supporting part 34, as depicted in FIG. 24. On the other hand, in a wire guide 36, a cylindrical part 36b having a convex shape (convex cylindrical part) is provided, and further, a hole or a groove 36a to which the rotation suppression part 34a of the wire guide supporting part 34 is fitted is formed on an abutting face which is abutted on the wire guide supporting face 34c of the wire guide supporting part 34, as depicted in FIG. 25.

By the way, it is commonly necessary to enhance machining accuracy of both of a wire guide supporting part and a wire guide so as to enhance restoration accuracy of a position (fixing position) on which the wire guide is fixed on the wire guide supporting part, raising cost. However, "a wire guide part" which supports the wire electrode 4 and "a wire guide fixing part" which fixes a wire guide are integrated in the examples of wire guides depicted in FIGS. 4 to 25, so that when the wire guide part is abraded away and discarded, the wire guide fixing part is also discarded simultaneously, raising running cost.

Figure 26:
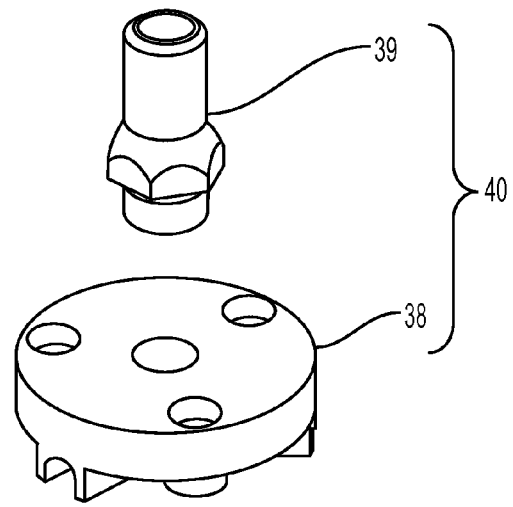
FIG. 26 illustrates that a wire guide is separated into "a wire guide part" which is a consumable part and "a wire guide fixing part" to which highly-accurate machining is performed.

Therefore, as depicted in FIG. 26, a wire guide 40 is configured to be able to be separated into a wire guide part 39 which is a consumable part and a wire guide fixing part 38 to which highly-accurate machining is performed. After the wire guide part 39 is once assembled to the wire guide fixing part 38, the wire guide part 39 and the wire guide fixing part 38 are used as a set without disassembling the wire guide part 39 and the wire guide fixing part 38 until the wire guide part 39 is abraded and discarded. On the other hand, when the wire guide 40 is discarded, only the wire guide part 39 is discarded and the wire guide fixing part 38 is reused with a new wire guide part 39. Accordingly, the configuration of the fixing mechanism of the wire guide according to respective embodiments of the present invention which are illustrated in FIGS. 4 to 25 can be realized with relatively lower cost.

As described above, according to the present invention, such wire guide fixing configuration is employed that a fixing mechanism and a positioning mechanism of a wire guide are separately disposed, the wire guide is fixed by a method same as prior art, the wire guide is positioned in the XY direction by abutting an abutting part which is formed on the wire guide and an abutting part which is formed on the wire guide supporting part on each other, and thus restoration accuracy of a fixing position of the wire guide with respect to the wire guide fixing part after detachment of the wire guide from the wire guide supporting part is enhanced. Accordingly, a wire electric discharge machine exhibiting high productivity can be provided with low cost.

The invention claimed is:

1. A fixing mechanism of a replaceable wire guide of a wire electric discharge machine, the wire guide being one of upper and lower wire guides of the wire electric discharge machine, the wire electric discharge machine configured to support a wire electrode by the upper and lower wire guides and relatively move the wire electrode with respect to a workpiece so as to machine the workpiece, the fixing mechanism comprising:
   a wire guide supporting part having a wire guide supporting face on which the wire guide of the wire electric discharge machine is fixed; and
   a fixing unit, wherein:
   the wire guide supporting part further has at least two planar parts not parallel to each other and having faces different from the wire guide supporting face;
   the wire guide has planar parts configured to be abutted on the two planar parts of the wire guide supporting part; and
   the fixing unit is configured to fix the wire guide on the wire guide supporting part in a state where the two planar parts of the wire guide supporting part and two of the planar parts of the wire guide are respectively abutted on each other.

2. The fixing mechanism according to claim 1, wherein the wire guide includes:
   a wire guide part configured to support the wire electrode, and
   a wire guide fixing part configured to be fixed on the wire guide supporting face, the wire guide part separably fixed to the wire guide fixing part.

3. A fixing mechanism of a wire guide of a replaceable wire electric discharge machine, the wire guide being one of upper and lower wire guides of the wire electric discharge machine, the wire electric discharge machine configured to support a wire electrode by the upper and lower wire guides and relatively move the wire electrode with respect to a workpiece so as to machine the workpiece, the fixing mechanism comprising:
   a wire guide supporting part having a wire guide supporting face on which the wire guide of the wire electric discharge machine is fixed; and
   a fixing unit, wherein
   the wire guide supporting part further has at least two planar parts not parallel to each other and having faces different from the wire guide supporting face;
   the wire guide has
      a planar part configured to be abutted on one of the two planar parts of the wire guide supporting part, and
      a cylindrical face configured to be abutted on the other planar part of the wire guide supporting part; and
   the fixing unit is configured to fix the wire guide on the wire guide supporting part in a state where the planar part and the cylindrical face of the wire guide are respectively abutted on the two planar parts of the wire guide supporting part.

4. A fixing mechanism of a wire guide of a replaceable wire electric discharge machine, the wire guide being one of upper and lower wire guides of the wire electric discharge machine, the wire electric discharge machine configured to support a wire electrode by the upper and lower wire guides and relatively move the wire electrode with respect to a workpiece so as to machine the workpiece, the fixing mechanism comprising:
   a wire guide supporting part having a wire guide supporting face on which the wire guide of the wire electric discharge machine is fixed; and
   a fixing unit, wherein:
   the wire guide supporting part further has at least two first fitting parts having a concave or convex shape and provided on the wire guide supporting face of the wire guide supporting part;
   the wire guide has at least two second fitting parts having a convex or concave shape, configured to be fitted to the concave or convex shape of the at least two first fitting parts of the wire guide supporting part, and provided on a face of the wire guide which is opposed to the wire guide supporting face when the wire guide is fixed on the wire guide supporting face; and
   the fixing unit is configured to fix the wire guide on the wire guide supporting part in a state where the second fitting parts of the wire guide are respectively fitted to the first fitting parts of the wire guide supporting part.

5. The fixing mechanism according to claim 4, wherein the wire guide supporting face includes symbols indicating a sequence in which a phase of fixing the wire guide to the wire guide supporting part is to be changed so as to prevent eccentric abrasion of the wire guide.

6. The fixing mechanism according to claim 4, wherein the wire guide includes symbols indicating a sequence in which a phase of fixing the wire guide to the wire guide supporting part is to be changed so as to prevent eccentric abrasion of the wire guide.

7. The fixing mechanism according to claim 6, wherein the wire guide further includes instructions of when the phase of fixing the wire guide to the wire guide supporting part is to be changed.

8. A fixing mechanism of a wire guide of a replaceable wire electric discharge machine, the wire guide being one of upper and lower wire guides of the wire electric discharge machine, the wire electric discharge machine configured to support a wire electrode by the upper and lower wire guides and relatively move the wire electrode with respect to a workpiece so as to machine the workpiece, the fixing mechanism comprising:
  a wire guide supporting part having a wire guide supporting face on which the wire guide of the wire electric discharge machine is fixed; and
  a fixing unit, wherein
  the wire guide supporting part further has
    a first cylindrical part having a concave or convex shape, and
    at least one first rotation suppression part having a shape of a planar surface, a cylindrical surface or a spherical surface, wherein the first cylindrical part and the at least one first rotation suppression part are provided on the wire guide supporting face of the wire guide supporting part;
  the wire guide has
    a second cylindrical part having a convex or concave shape and being rotatably fitted to the first cylindrical part of the wire guide supporting part, and
    at least one second rotation suppression part having a shape of a planar surface, a cylindrical surface or a spherical surface, wherein the second cylindrical part and the at least one second rotation suppression part are provided on a face of the wire guide which is opposed to the wire guide supporting face when the wire guide is fixed on the wire guide supporting face; and
  the fixing unit is configured to fix the wire guide on the wire guide supporting part in a state where the second cylindrical part of the wire guide is rotatably fitted to the first cylindrical part of the wire guide supporting part, and the first rotation suppression part of the wire guide supporting part and the second rotation suppression part of the wire guide are abutted on each other in a direction in which relative rotation of the first and second cylindrical parts is stopped.

9. The fixing mechanism according to claim 8, wherein
the first rotation suppression part of the wire guide supporting part extends from the wire guide supporting face toward the wire guide along an axis of relative rotation between the first and second cylindrical parts, and
the second rotation suppression part of the wire guide extends transversely to the axis so as to abut the first rotation suppression part.

10. The fixing mechanism according to claim 8, wherein
the first rotation suppression part of the wire guide supporting part extends from the wire guide supporting face toward the wire guide along an axis of relative rotation between the first and second cylindrical parts, and
the second rotation suppression part of the wire guide includes a hole in the face of the of the wire guide, the first rotation suppression part received in the hole, the hole elongated in a direction transverse to the axis.

* * * * *